United States Patent [19]
Takakura et al.

[11] Patent Number: 5,574,566
[45] Date of Patent: Nov. 12, 1996

[54] APPARATUS OF DIGITALLY RECORDING AND REPRODUCING VIDEO SIGNALS

[75] Inventors: Eiichi Takakura, Nagareyama; Michiyuki Sugino, Chiba; Takayoshi Yamaguchi, Nagareyama; Akiyoshi Nagawo, Chiba, all of Japan

[73] Assignee: Sharp Kabushiki Kaisha, Osaka, Japan

[21] Appl. No.: 377,238

[22] Filed: Jan. 24, 1995

[30] Foreign Application Priority Data

Jan. 24, 1994 [JP] Japan .................................. 6-005738

[51] Int. Cl.⁶ .............................. H04N 5/76; H04N 5/78
[52] U.S. Cl. ......................... 386/109; 360/10.1; 386/112
[58] Field of Search .................................. 358/335, 342, 358/310, 312, 311; 360/32, 33.1, 10.1, 13; 348/384, 390, 399, 400, 403

[56] References Cited

U.S. PATENT DOCUMENTS

| | | | |
|---|---|---|---|
| 5,335,117 | 8/1994 | Park et al. | 360/48 |
| 5,479,264 | 12/1995 | Ueda et al. | 358/335 |

FOREIGN PATENT DOCUMENTS

| | | |
|---|---|---|
| 0471118 | 2/1992 | European Pat. Off. . |
| 0556063 | 8/1993 | European Pat. Off. . |
| 0559467 | 9/1993 | European Pat. Off. . |

*Primary Examiner*—Thai Q. Tran
*Assistant Examiner*—Robert Chevalier

[57] ABSTRACT

In an apparatus of digitally recording and reproducing video signals, when video signal data in one image frame is divided into a multiple-number of parts (N-parts) by dividing the image frame into N-divided rectangular regions and the N-parts of data are recorded on respective N tracks, each rectangular region is divided into blocks each having a multiple number of pixels and the thus generated blocks is subjected to a bit reduction coding operation. In recording the blocks, each of blocks are recorded onto a corresponding track in such a sequence that the blocks are scanned in a reciprocating manner along short-side directions of the rectangular region on the image frame. When the data is reproduced in a varied speed playback mode, the data are modified by every short-side row of blocks to thereby provide a high-quality playback picture at the varied speed.

3 Claims, 5 Drawing Sheets

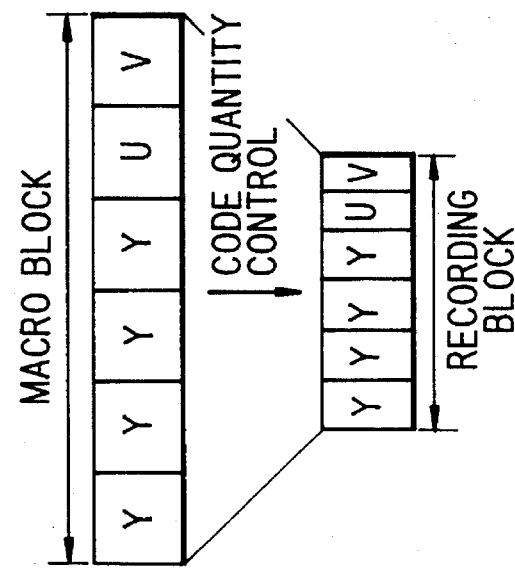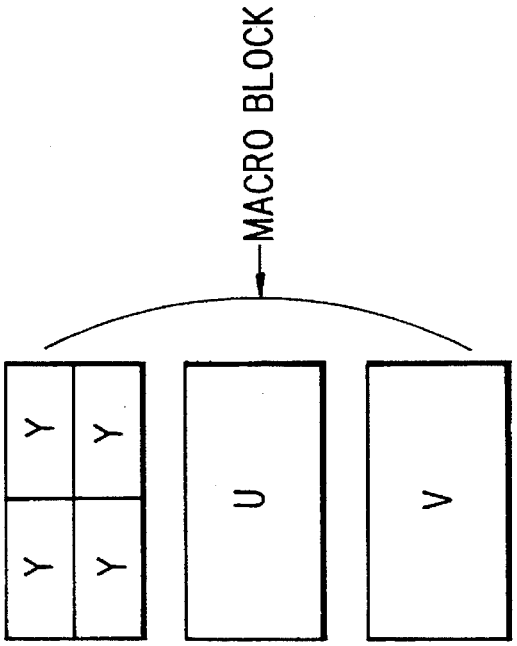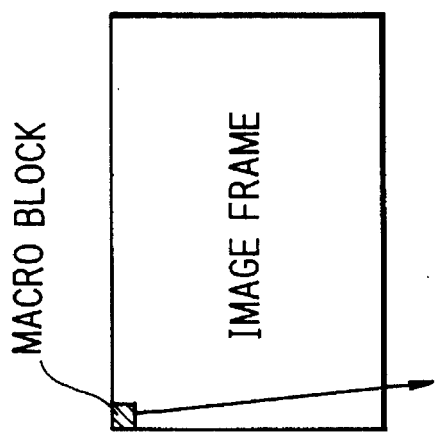

5,574,566

APPARATUS OF DIGITALLY RECORDING AND REPRODUCING VIDEO SIGNALS

BACKGROUND OF THE INVENTION (1) Field of the Invention

The present invention relates to an apparatus of digitally recording and reproducing video signals in which video signals are subjected to a bit reduction coding operation so as to be recorded and reproduced, and more particularly relates to an apparatus of digitally recording and reproducing video signals in which a correction processing means is provided which is able to effectively inhibit deterioration of image quality during reproducing at a varied speed such as in a high-speed search mode.

(2) Description of the Prior Art

An apparatus for recording and reproducing video signals using a bit reduction coding technique, typically represented by a digital VTR, is composed as shown in FIG. 1. First, the structure of the apparatus will be briefly described with reference to FIG. 1. An example of the technology of this kind can be found in, for example, EP559,467. Generally, in such a digital VTR, image blocks each having a specified size are rearranged (in a block shuffling circuit 101) and the resulting blocks are subjected to a bit reduction coding operation (in a bit reduction coding circuit 102) in order to reduce information quantity to be recorded on the recording tape. Thereafter, the bit reduction coded data is added with an error correcting code (parity) (in an error correcting/coding circuit 103). Next, the resulting data is added with a synchronization signal and an ID signal for recording and reproducing (in a Sync and ID adding circuit 104). Subsequently, the thus processed data is modulated (in a modulating circuit 105) in such a manner as to inhibit the DC component thereof and recorded on a tape (a recording medium 106).

On the side for reproducing, data on the tape is demodulated (in a demodulating circuit 107). The resulting data is subjected to an error correcting operation and decoded by each coded block as a unit (in an error correcting/decoding circuit 109). During the correction in the correcting circuit, any part which could not be corrected is supplied without being decoded to a decoding/modifying circuit 110 to be modified therein.

Thereafter, the blocks are rearranged (in a block deshuffling circuit 111) in a reverse order to that executed in the recording side whereby the original video signal is reproduced.

These are the basic structure of the digital VTR using the bit reduction coding technique.

Meanwhile, there is a certain limitation in reducing information quantity by the bit reduction coding when a high-quality image must be produced. Accordingly, if the data quantity after coding is large, the data is required to be divided and recorded in many tracks taking into consideration the recording rate.

In this case, if the number of tracks divided is markedly large, the number of blocks capable of being reproduced continuously on the image frame in a high-speed playback mode becomes less, so that many block boundaries appear in rectangular regions, resulting in a deficient picture.

SUMMARY OF THE INVENTION

The present invention is based on the fact that each of rectangular regions on the image frame which each are recorded on individual tracks has a long side with a greater number of blocks and a short side with a smaller number of blocks. It is therefore an object of the present invention to provide an improved apparatus of digitally recording and reproducing video signals in which a high-quality picture can be reproduced even in the varied speed playback mode. That is, the apparatus of the present invention is constructed in such a manner that data of blocks are recorded successively as scanning the blocks in short-side directions in a reciprocating manner, and in the varied playback mode, the possibility of reproduction is judged by every short-side row of blocks to renew the image by the short-side block rows as units whereby any block boundary may be left out at least in the middle of short-side rows of blocks.

The present invention has been achieved to attain the above object and the gist of the present invention resides in that an apparatus of digitally recording and reproducing video signals comprises:

a recording system including:
   a block-generating means for forming blocks by collecting a plurality of sampling values;
   a bit reduction coding means for forming recording blocks from the blocks by subjecting each block to an orthogonal transformation and controlling code lengths of data to be equalized in each block or each group of blocks;
   a rearranging means for rearranging the recording blocks for recording; and
   a recording means for recording the rearranged recording blocks onto a recording medium; wherein, when video signal data in one image frame is divided into plural parts (N parts) by dividing the image frame horizontally and/or vertically into N-divided rectangular regions and the thus formed N parts of the divided data are recorded on respective plural tracks (N tracks), the rearranging means rearranges video signal data in each divided region in such a manner that significant components of a block and a proximal block thereto in the divided region on the image frame are allotted to proximal recording blocks which are to be recorded onto proximal positions on a corresponding track on the recording medium, and a reproducing system including:
   an inverse-rearranging means for inversely rearranging detected signal digitally recorded on a recording medium by means of the recording system in a reverse order to that executed when the data is recorded to thereby produce recording blocks;
   a decoding means for decoding original blocks of video data from the recording blocks; and
   a modifying means for reducing adverse effects on image quality when any of the recording blocks is reproduced erroneously, wherein judgment of whether or not data is to be modified is effected on each short-side row of blocks in the rectangular region as a unit so as to modify the data based on the judgment.

In the above configuration, it is effective that judgment of whether or not data is to be modified is effected on each block as a unit in the normal playback mode and is effected on each short-side row of blocks in the rectangular region as a unit in a varied playback mode whereby pertinent modification of data is made. It is also effective in the same configuration that judgment of whether or not data is to be modified is effected on each short-side row of blocks in the rectangular region as a unit in a varied playback mode in which the playback speed is relatively low while the judgment is effected on each block as a unit in a varied playback mode in which the playback speed is relatively high whereby pertinent modification of data is made.

In the above configuration, block boundaries in a rectangular region appear only in the direction parallel to the short-side direction while no block boundary will appear in the middle of short-side rows of blocks. Accordingly, interference in block boundaries may be markedly reduced, whereby it is possible to obtain a high-quality playback picture in the varied speed mode.

Since the unit of judgment as to the possibility of reproduction is pertinently changed over between the normal playback mode and the varied playback mode or depending on the speed in the varied playback mode, it is possible to reproduce an optimal picture in each mode.

BRIEF DESCRIPTION OF THE DRAWINGS

FIG. 3A is a schematic view showing an example of code length control in the present invention and specifically showing a relation between a macro block on an image frame and DCT blocks of brightness signals and color-difference signals constituting the macro block;

FIG. 3B is a schematic view showing a relation between a macro block and a recording block in an example of controlling code lengths in the present invention;

DESCRIPTION OF THE PREFERRED EMBODIMENTS

An embodiment of the present invention will hereinafter be described in detail with reference to the accompanying drawings.

Figure 1:
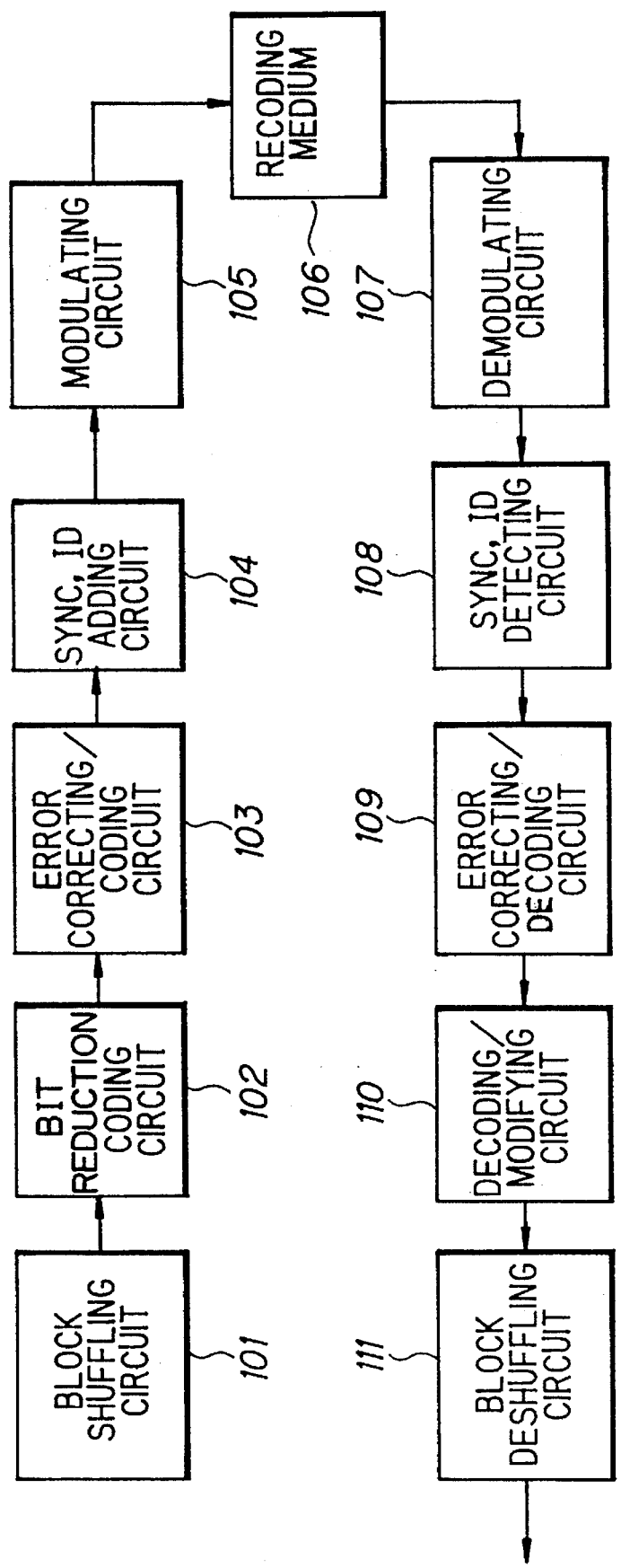
FIG. 1 is an overall illustrative view showing a prior art digital VTR using a bit reduction coding technique.
Figure 2:
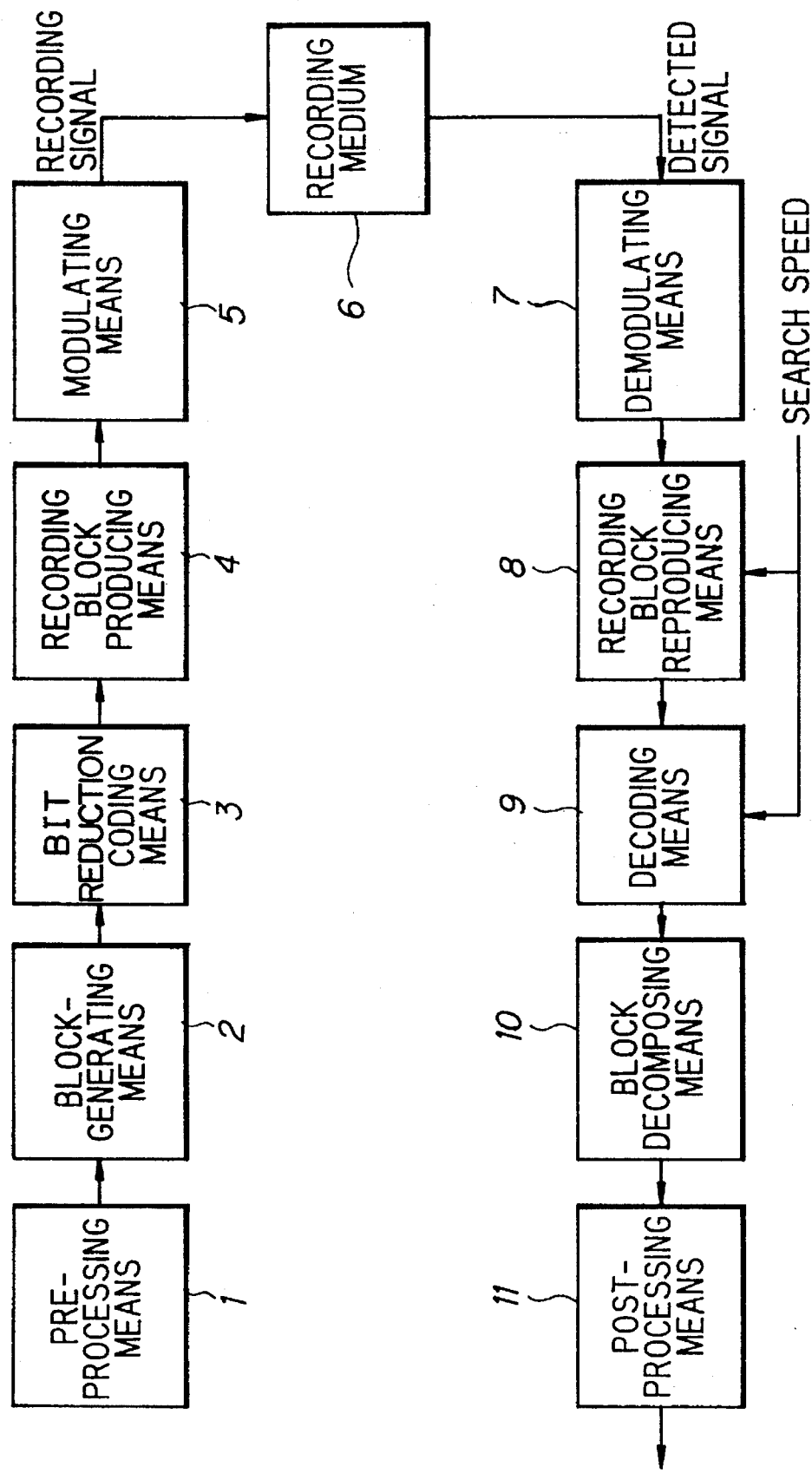
FIG. 2 is a block diagram showing an embodiment of an apparatus of digitally recording and reproducing video signals in accordance with the present invention.

FIG. 2 is a block diagram of an apparatus of digitally recording and reproducing video signal (a digital VTR) in accordance with the present invention. In the figure, the components of the apparatus include a pre-processing means 1, a block-generating means 2, a bit reduction coding means 3, a recording block processing means 4, a modulating means 5, a recording medium 6, a demodulating means 7, a recording block reproducing means 8, a decoding means 9, a block decomposing means 10 and a post-processing means 11. The following description will be described on the operation of the thus constructed apparatus of digitally recording and reproducing video signals in accordance with the embodiment of the present invention.

In the recording system, the pre-processing means 1 effects pre-treatment before the following bit reduction coding operation, specifically effects operations such as sub-sampling in the horizontal direction and/or linearly ordering of color-difference signals in accordance with the input signal. In the block-generating means 2, the data from the pre-processed signal is formed into DCT blocks each composed of 8 pixels×8 lines. In the bit reduction coding means 3, an orthogonal transformation such as the well-known DCT (discrete cosine transformation) is effected on data of each DCT block outputted from the block-generating means 2. Then the resulting coefficient data are quantized in accordance with degree of importance as to image-display and is subjected to a variable-length coding operation such as Huffman coding in order to reduce information quantity and control the DCT block data so that all the generated code lengths in each DCT block or each unit group consisting of plural DCT blocks may be equalized, thus forming recording blocks. In this embodiment, to simplify the explanation, it is assumed that one macro block is composed of, as shown in FIG. 3A, DCT blocks of brightness signals and DCT blocks of color-difference signals both representing the same position on the image frame and that each macro block is controlled in code length to construct a recording block as shown in FIG. 3B. In the recording block processing means 4, each of the thus produced recording blocks is provided with a code such as, for example, the well-known Reed-Solomon code, for the purpose of correcting errors which would appear upon reproducing. The thus coded blocks are rearranged in such an order that the data are to be recorded on the tape. In the following modulating means 5, Sync and ID codes to be used for reproducing are provided for each recording block with an error correcting code and the thus processed data is modulated in such a manner as to inhibit the DC component thereof and the resultant data is recorded on the recording medium 6.

Figure 4A:
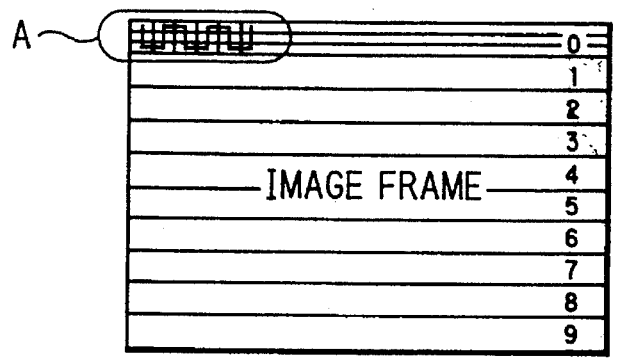
FIG. 4A is a schematic view showing a typical method of dividing one image frame and a relation of recording positions on a tape with positions on the image frame in the present invention.
Figure 4B:
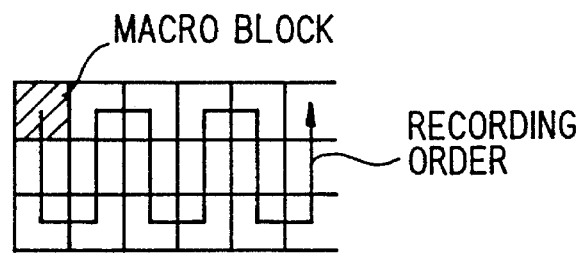
FIG. 4B is an enlarged view of a portion designated at A in FIG. 4A.
Figure 4C:
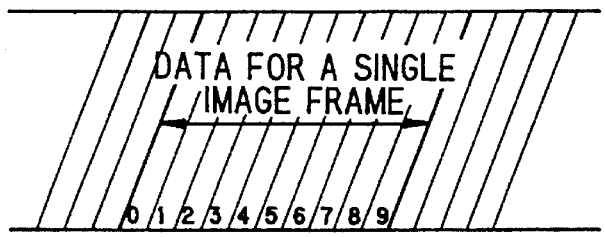
FIG. 4C is a schematic view showing a recording state of image data onto the tape in FIG. 4A.

When recorded on the tape, the data are arranged on the tape as follows. That is, the full image frame is divided into ten horizontally elongated rectangular regions as shown in FIG. 4A. The thus divided ten data sets in rectangular regions are coded as stated above and recorded respectively onto ten tracks divided as shown in FIG. 4C. On each track, adjacent recording blocks on the track correspond to data components as to adjoining macro blocks on the image frame while all the macro blocks along the short side of the rectangular region (the side on which a less number of blocks are contained) are continuously recorded as shown in FIG. 4B, which is an enlarged view showing a portion designated at A in FIG. 4A.

In the reproducing system, thus recorded signals are detected by the demodulating means 7. In the recording block reproducing means 8, errors arising in the detected data during the reproducing are corrected. At the time, if errors in any recording block could not be corrected, the data of the block is replaced by the data in the previous frame. Simultaneously, the data are rearranged in a reverse order to that executed at recording so as to reproduce recording blocks. In the decoding means 9, the thus reproduced recording blocks are subjected successively to variable-length decoding, inverse-quantization and IDCT in that order so as to regenerate DCT blocks. The DCT blocks are decomposed in the DCT block decomposing means 10. Thereafter, in the post-processing means 11, the data is subjected to a treatment for compensating the subsampling and the like effected at recording so as to provide a reproduced image. As described, since any defective blocks which could not be corrected during reproducing are replaced by the data of the previous frame, it is possible to reproduce an image free from significant image deficiency.

Figure 5:
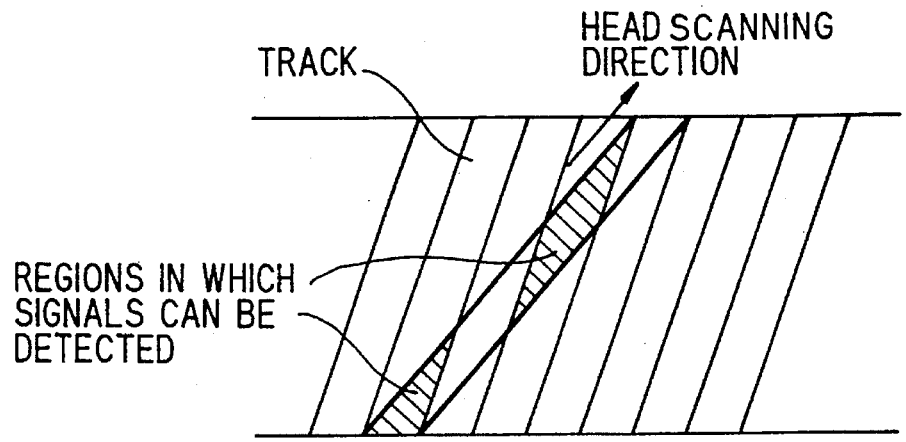
FIG. 5 is a schematic view showing an example of a head trace in a varied speed playback mode.
Figure 6A:
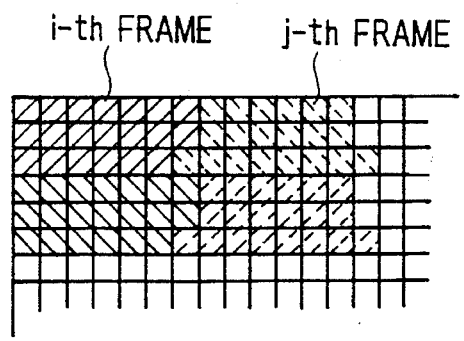
FIG. 6A is a schematic view showing regions which are reproduced during a varied speed playback mode in a conventional method.
Figure 6B:
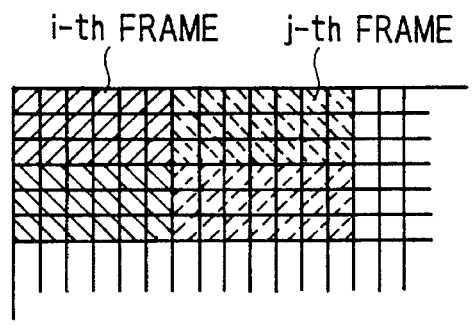
FIG. 6B is a schematic view showing regions which are reproduced during a varied speed playback mode in the present invention.

During the varied speed playback mode, the reproducing head scans data as traversing a plurality of tracks on the recording medium as shown in FIG. 5. In this state, the number of blocks which are reproduced from a hatched region in FIG. 5 does not necessarily correspond to a multiple of the number of all the blocks along the short side of the rectangular region. For this reason, if judgment as to the possibility of reproduction and the following modifying treatment are effected on each block, image frame data Generated from different tracks (for i-th and j-th frames) forms an image frame with irregular boundaries, deteriorating quality of the image, as shown in FIG. 6A. To deal with this, in the present invention, judgment as to the possibility of reproduction and the following modifying treatment may be effected on every short-side row of blocks. By this operation, irregularities at boundaries Generated on the resulting image due to the image data from different tracks for i-th and j-th frames can be reduced as shown in FIG. 6B, whereby it is possible to obtain a high-quality playback picture in the varied speed mode. On the other hand, when judgment as to the possibility of reproduction and the following modifying treatment are effected on every short-side row of blocks in the normal speed playback mode, blocks which would not require replacement may be replaced, possibly degrading quality of the image. Accordingly, it is advantageous that the judgment as to the possibility of reproduction is effected one by one on each block in the normal playback mode while the judgment is effected on every short-side row of blocks in the varied speed playback mode so as to effect the following modifying treatment.

As the speed in the varied speed playback mode becomes higher, the number of blocks detected continuously from one track becomes less. In such a state, if judgment as to the possibility of reproduction and the following modifying treatment are effected on every short-side row of blocks, the renewal rate of the picture becomes lowered resulting in a degraded image. Therefore, at above a certain reproducing speed, for example, a speed at which the number of blocks continuously detected from one track is two times or less of the number of the full blocks along the short side, it is better that the judgment as to the possibility of reproduction is effected one by one on each block to effect the following modifying treatment.

Thus, the first embodiment of the present invention has been described heretofore. However, the present invention should not be limited by the above specific example. That is, the main feature of the present invention resides in the fact that data on the blocks in a rectangular region on the image frame is recorded on a corresponding track as all the blocks are scanned in a reciprocating manner in short-side directions of the rectangular region while data-reproduction and the following modifying treatment in the varied speed playback mode are effected on every short-side row of blocks whereby a high-quality playback picture at the varied speed may be obtained. Accordingly, there is no limitation imposed on the circuit configuration, for example, the rearrangement of blocks may be effected at any stage, as long as the above feature is preserved.

Next, a second embodiment of the present invention will be described in which control of code lengths is effected on every unit group consisting of a plurality of macro blocks by taking into consideration the efficiency of the bit reduction coding operation.

The operation of the embodiment will hereinafter be described with reference to the block diagram shown in FIG. 2.

Figure 7A:
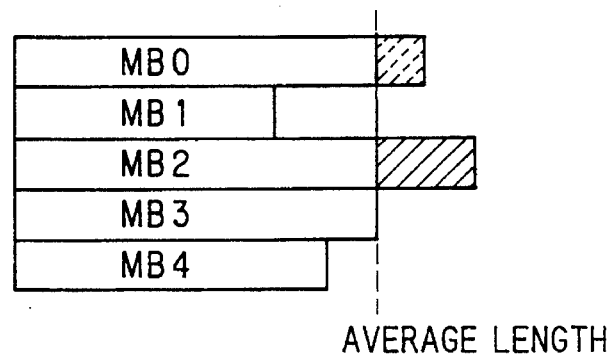
FIG. 7A is a schematic view showing a structure of recording blocks in a second embodiment of the present invention and specifically showing a state before code lengths of macro blocks are equalized.
Figure 7B:
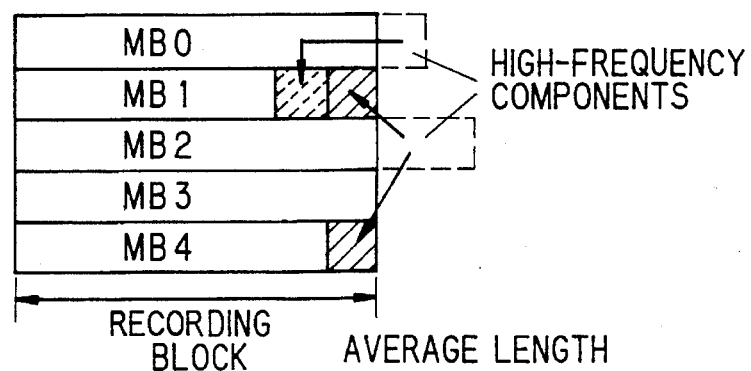
FIG. 7B is a schematic view showing a state after code lengths of the macro blocks in FIG. 7A are equalized.

In the recording system, the pre-processing means 1 effects pre-treatment before the following bit reduction coding operation, specifically effects operations such as sub-sampling in the horizontal direction and/or linearly ordering of color-difference signals in accordance with the input signal. In the block-generating means 2, the data from the pre-processed signal is formed into DCT blocks each composed of 8 pixels×8 lines. Thereafter, macro blocks are constructed by the combination of DCT blocks of brightness signals and DCT blocks of color-difference signals both corresponding to the same position on the image frame. Next, each of the macro blocks is subjected to a shuffling operation in which the order of code length control in the following bit reduction coding means is taken into account. In the bit reduction coding means 3, the DCT is effected on data of each DCT block. Then the resulting coefficient data are quantized in accordance with degree of importance as to image-display and is subjected to a variable-length coding operation such as Huffman coding in order to reduce information quantity and to control the coded data so that lengths of the generated codes in every unit group consisting of five macro blocks may be equalized. In this operation, since the coded data lengths differ from one another as shown in FIG. 7A, depending upon information quantities of individual macro blocks, the average code length of five macro blocks is assumed as a typical code length for the five coded data. Coded data of each macro block, that is, additional information serving an important role upon decoding, a DC component, low-frequency components, high-frequency components, are stored successively in that order into a corresponding recording block area with the typical code length. If the coded data is longer than the typical code length, the high-frequency components that could not be stored within the recording block are stored into an unoccupied area of recording blocks allotted for the other macro block having a code length shorter than the average code length. Thus, the recording block is composed as shown in FIG. 7B for each of five macro blocks. In the recording block processing means 4, each of the thus produced recording blocks is provided with a code such as the Reed-Solomon code, for the purpose of correcting errors which would appear upon reproducing. The thus coded blocks are rearranged in such an order that the data are to be recorded on the tape. In the following modulating means 5, Sync and ID codes to be used for reproducing are provided for each recording block with an error correcting code and the thus processed data is modulated in such a manner as to inhibit the DC component thereof and the resultant data is recorded on the recording medium 6.

When recorded on the tape, the data are arranged on the tape as follows. That is, the full image frame is divided into ten horizontally elongated rectangular regions as shown in FIG. 4A. The thus divided ten data groups in rectangular regions are coded as stated above and recorded respectively onto ten tracks divided. On each track, adjacent recording blocks on the track correspond to significant data components as to adjoining macro blocks on the image frame while all the macro blocks along the short side of the rectangular region are continuously recorded as shown in FIG. 4B.

In the reproducing system, thus recorded signals are detected by the demodulating means 7. In the recording block reproducing means 8, errors arising in the detected data during the reproducing are corrected. At the time, if errors in any recording block could not be corrected, the data of the block is replaced by the data in the previous frame. Simultaneously, the data are rearranged in a reverse order to that executed at recording to reproduce recording blocks. In the decoding means 9, the thus reproduced recording blocks are subjected successively to variable-length decoding, inverse-quantization and IDCT in that order so as to regenerate DCT blocks. During this operation, any macro block in which original high-frequency components alone are replaced will be decoded without using the replaced high-frequency components but using only the originally existing additional information, DC component and low-frequency components. On the other hand, if any macro block in which significant components such as the DC component etc. are replaced with other corresponding components, the macro block will be decoded using the data after the replacement. The thus obtained DCT blocks are decomposed in the DCT block decomposing means 10. Thereafter, in the post-processing means 11, the data is subjected to a treatment for compensating the sub-sampling and the like effected at recording. By the modifying treatment thus effected, any defective blocks which could not be corrected during reproducing can be reproduced without causing any significant image deficiency though some high-frequency components have been left out.

In the varied speed playback mode, when judgment as to the possibility of reproduction is effected on every short-side row of blocks and thereafter a similar modifying treatment is effected on the data, it is possible to obtain a high-quality playback picture at the varied speed though some high-frequency components of the data have been left out.

Thus, the main feature of the present invention resides in the fact that recording blocks each containing significant components of data on a macro block in a rectangular region on the image frame are continuously recorded on a corresponding track and in the varied speed playback mode, modifying treatment is effected on every row of macro blocks along the short side of the rectangular region whereby a high-quality playback picture may be obtained at the varied speed. Therefore, the number of macro blocks constituting the unit for controlling code quantities and the circuit configuration for rearranging macro blocks should not be limited.

Further, in a recording system where, by effecting so called channel split, a pair of data on neighboring macro blocks on the image frame are alternately recorded on a pair of tracks, judgment of possibility of reproduction may be made by every unit consisting of blocks along the short side of the rectangular region whose image information is recorded on the pair of tracks.

As described heretofore, according to the apparatus of the present invention thus constructed, since recording blocks each containing significant components of data on a macro block in a rectangular region on the image frame are continuously recorded on a corresponding track and in the varied speed playback mode, modifying treatment is effected on every row of macro blocks along the short side of the rectangular region, it is possible to obtain a high-quality playback picture at the varied speed.

In the apparatus of the present invention, since judgment of the possibility of reproduction and the following modifying treatment are effected on every block in the normal playback mode and on every short-side row of blocks in the varied playback mode, it is possible to obtain a high-quality picture in both the normal playback mode and the varied speed playback mode.

In the apparatus of the present invention, when the playback speed in the varied speed mode is at a certain predetermined level or less, the judgment as to the possibility of reproduction and the following modifying treatment are effected on every short-side row of blocks. When the playback speed in the varied speed mode is more than the predetermined level, the judgment as to the possibility of reproduction and the following modifying treatment are effected on every block. Therefore, it is possible to obtain a high-quality picture in different playback speeds.

What is claimed is:

1. An apparatus of digitally recording and reproducing video signals comprising:

a recording system including:

block-generating means for forming blocks by collecting a plurality of sampling values;

bit reduction coding means for forming recording blocks from said blocks by subjecting each block to an orthogonal transformation and controlling code lengths of data to be equalized in each block or each group of blocks;

rearranging means for rearranging said recording blocks for recording; and recording means for recording the rearranged recording blocks into a recording medium; wherein, when video signal data in one image frame is divided into plural parts (N parts) by dividing the image frame horizontally and/or vertically into N-divided rectangular regions and the thus formed N parts of the divided data are recorded on respective plural tracks (N tracks), said rearranging means rearranges video signal data in each divided region in such a manner that significant components of a block and a proximal block thereto in the divided region on the image frame are allotted to proximal recording blocks which are to be recorded onto proximal positions on a corresponding track on the recording medium, and a reproducing system including:

inverse-rearranging means for inversely rearranging detected signal digitally recorded on a recording medium by means of said recording system in a reverse order to that executed when the data is recorded to thereby produce recording blocks;

decoding means for decoding original blocks of video data from said recording blocks; and modifying means for reducing adverse effects on image quality when any of said recording blocks is reproduced erroneously, wherein judgment of whether or not data is to be modified is effected on each short-side row of blocks in the rectangular region as a unit so as to modify the data based on the judgment.

2. An apparatus of digitally recording and reproducing video signals according to claim 1 wherein judgment of whether or not data is to be modified is effected on each block as a unit in the normal playback mode and is effected on each short-side row of blocks in the rectangular region as a unit in a varied playback mode whereby pertinent modification of data is made.

3. An apparatus of digitally recording and reproducing video signals according to claim 1 wherein judgment of whether or not data is to be modified is effected on each short-side row of blocks in the rectangular region as a unit in a varied playback mode in which the playback speed is relatively low while the judgment is effected on each block as a unit in a varied playback mode in which the playback speed is relatively high whereby pertinent modification of data is made.

* * * * *